Feb. 29, 1944.         W. A. ARNESEN         2,343,041
                         OTOSCOPE
                     Filed Feb. 1, 1941         2 Sheets-Sheet 1

INVENTOR
Walter A. Arnesen
BY
Ramsey, Kent, Chisholm and Lutz
his ATTORNEYS

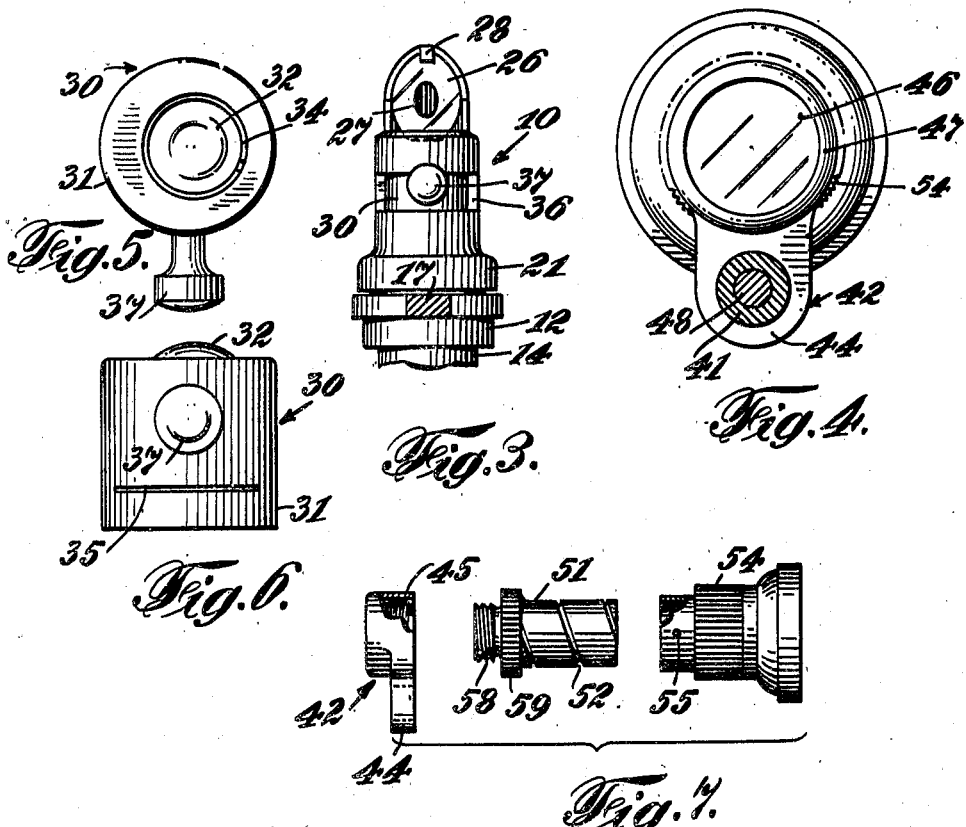
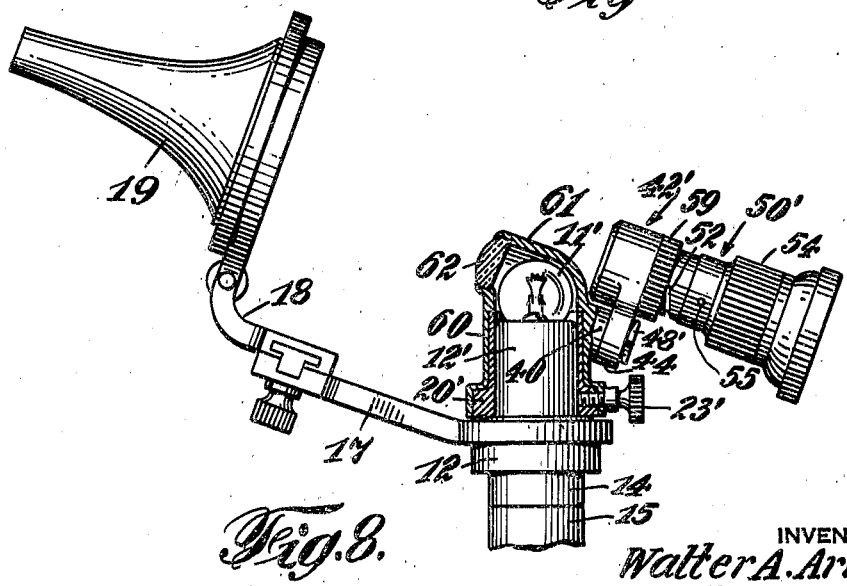

Patented Feb. 29, 1944

2,343,041

UNITED STATES PATENT OFFICE 2,343,041

OTOSCOPE

Walter A. Arnesen, New York, N. Y., assignor to National Electric Instrument Co. Inc., Long Island City, N. Y., a corporation of New York Application February 1, 1941, Serial No. 376,956

14 Claims. (Cl. 128—9)

This invention relates to improvements in diagnostic instruments and more particularly to improvements in otoscopes and similar devices.

An object of the present invention is to provide an otoscope head of composite structure formed of a metallic shell having moulding material surrounding the same and extending beyond the same to support a light directing member.

Another object of the invention is to provide an otoscope head of composite construction, such head having a substantially tubular part fitting over an electric light bulb, the tubular part having a metallic lining, and the head having a hood portion above the tubular part to support a light directing member.

Another object of the present invention is to provide an otoscope so constructed as to incorporate therein a light directing member having associated therewith an inspection lens support, which inspection lens support is so constructed as to receive a telescope to cooperate with the inspection lens.

Another object of the invention is to provide an otoscope in which a head member fitting over an electric light bulb has an inspection lens mount secured thereto, which lens mount is adapted to receive and retain a telescope to cooperate with the inspection lens in the mount.

Another object of the invention is to provide an otoscope of such construction that light can be directed in such fashion as to prevent the creation of shadows on the field of examination when the instrument is used in the normal fashion.

An additional object of the invention is to provide an otoscope utilizing, as a light directing member, a mirror apertured for examination purposes, which mirror is so positioned as to direct rays of light into a speculum carried by the instrument, and is of such size as not to interfere with instrumentation.

A further object of the invention is to provide a head for an otoscope, which head serves as a mount for a light directing member and which serves as a casing to retain a compensating device utilized to compensate for dissymmetry of a filament of an electric light bulb.

A still further object of the invention is to provide in conjunction with a head fitting over an electric light bulb and having a light directing member mounted therein, a condensing lens which is eccentrically mounted relative to the head and which mount is also movable longitudinally of the head to compensate for variations in electric light bulbs.

Other features, objects and advantages of the invention will become apparent by reference to the following detailed description of the accompanying drawings wherein:

Fig. 3 is a fragmentary view of the same instrument taken substantially on the line 3—3 of Fig. 1;

Fig. 4 is a section taken substantially on the line 4—4 of Fig. 2;

Fig. 5 is a plan view of the condensing lens mount incorporated in the tubular housing;

Fig. 6 is a side elevation of the same mount;

Fig. 7 is a collective view of the inspection lens mount and of a telescope cooperating with the inspection lens in the mount, and Fig. 8 is a view similar to Fig. 1, partially in section of a modified form of the invention.

Figure 1:
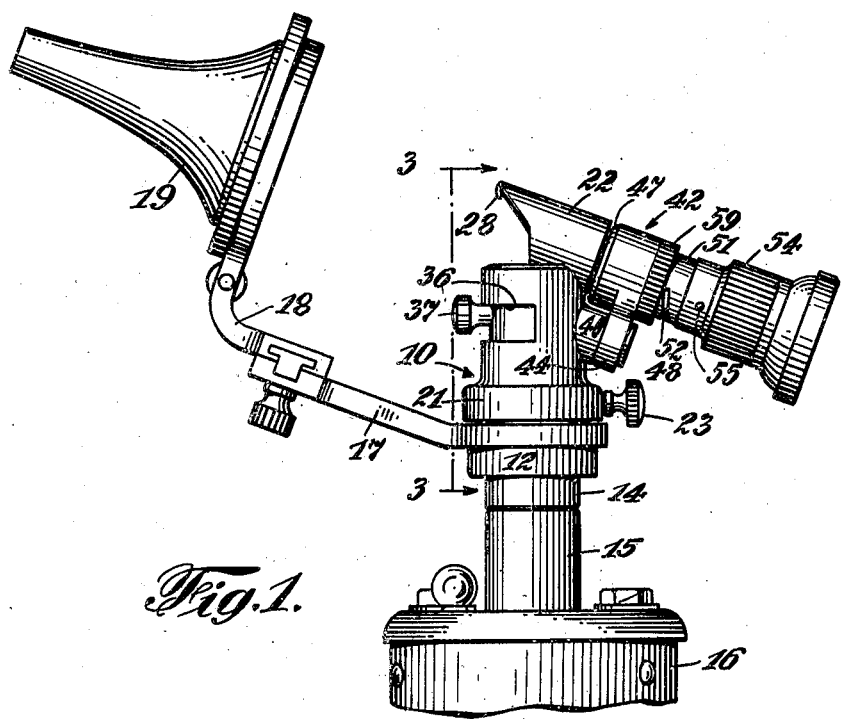
Fig. 1 is a side elevation of an instrument embodying the invention.

Referring now to the drawings and particularly to Figs. 1–7 inclusive, 10 indicates generally a substantially tubular housing which serves to receive an electric light bulb 11 threaded into the top of a support 12, which support in turn has an extension 14 to be threaded into the receptacle-shaped top 15 of a battery handle 16 or some similar device. The support 12 has an arm 17 extending outwardly and angularly upwardly therefrom, which arm 17 has slidably secured thereto a speculum holder 18 adapted to retain a speculum 19. The particular arrangement whereby the speculum holder is movable relative to the arm 17 forms no part of the present invention since this arrangement is disclosed in my Patent Number 2,154,885.

The housing 10 is made up of a metallic shell 20 having an enlarged bottom portion, which shell 20 is covered by a coating of insulating material 21, preferably thermoplastic material, moulded around the shell 20. Formed integrally with the material 21 surrounding the shell is a hood portion 22, the axis of which crosses the axis of the shell 20 at an upwardly extending angle. The hood 22 has an axial bore 24 and has a recess 25 in the top thereof. This hood 22 serves as a seat for a light directing member, in this form a mirror 26, which is provided with a through aperture 27. The mirror is retained in place by a lip 28 formed integrally with the hood and by a spring member 29 inserted in the top part of the housing and above the top edge of the shell 20. A suitable stepped seat is provided for the spring 29 which bears against the lower edge of the mirror 26. The head can be secured to supporting member 12 by a set screw 23 passing through the lower end of the head.

Figure 2:
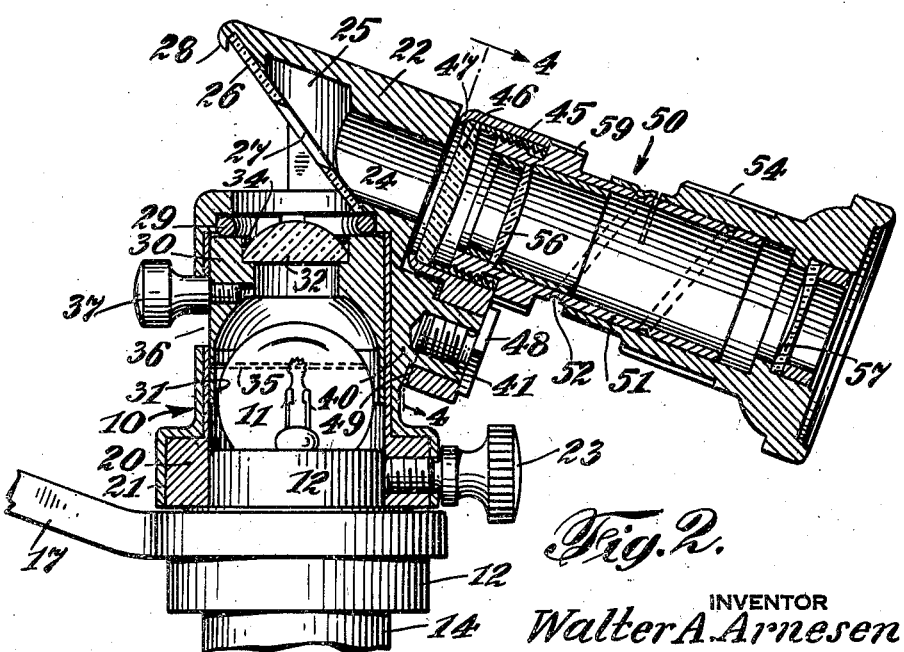
Fig. 2 is an enlarged vertical section of the same instrument.

Located in the head 10 is a condensing lens mount 30. The mount 30 is in the form substantially of a metallic cap so shaped as to have a thin wall or skirt 31 which can fit around the light bulb 11. The upper part of the mount has a through opening eccentrically disposed and stepped for the reception of a condensing lens 32. The lens 32, as shown in Fig. 2, is seated on the step and is retained in place by a spring member 34 which snaps into the slightly undercut wall surrounding the lens. The lower portion or skirt 31 has a slot 35 therein, which slot makes possible such a slight distortion of the lower end of the skirt as to so change the shape of the skirt that it can be retained in the shell 20 by friction.

The lens mount 30 is of such size and shape as to be capable of axial movement within the shell 20 and also rotary movement therein. For this purpose a considerable portion of the side wall of the head 10 is cut away as shown at 36 for the passage of an operating handle or stud 37 screw threaded into the mount 30. That portion of the stud 37 located in the opening 36 is of such size that it can move in this opening either axially of the head or rotatably relative thereto. Of course rotation and axial movement can be combined, resulting in what approaches a spiral movement of the mount. This versatile movement of the mount, due to the eccentric disposition of the condensing lens 32, compensates for any dissymmetry of the filament of the bulb 11 so that the most desirable concentration of light rays can be effected upon the light directing member or mirror 26, which member directs the light rays into a speculum 19.

The moulded material 21 of the head in addition to having the hood 22 formed integrally therewith likewise has an integral enlargement 40 beneath and laterally displaced from the hood 22. The enlargement 40 terminates in a stud 41 which is bored. In association with the stud 41 use is made of an inspection lens mount likewise preferably made of some suitable mouldable insulating material. The inspection lens mount comprises a member 42 having a depending portion 44 apertured to fit around the stud 41. The upper part of the member 42 has a metallic tubular insert 45 moulded therein to retain an inspection lens 46 between the insert and one end of the mount, the retention being accomplished by curving the end of the mount over as at 47 in the event the insulating material is of thermoplastic nature. If the material is not of such nature, other conventional means can be utilized for retaining the inspection lens in place. The insert 45 is internally threaded as shown for a purpose to be explained later. The mount 42 is held in assembly with the head by means of a headed screw 48 threaded into the bore of the stud 41 and a thin spring washer 49 interposed, as shown in Fig. 2, permits such tension to be applied by the screw 48 as to allow the mount to be held in any selected position determined by rotating the mount about the stud 41 from a position in which the inspection lens 46 is in axial alignment with bore 24 to a position in which these parts are out of axial alignment. Thus with this arrangement it is possible for an operator to view the area under examination through the speculum 19 either directly by observation through the bore 24 of the hood and the sight opening 27 in the mirror 26; or if magnification of the area under inspection is desired, the lens mount 42 can be moved into the proper position shown in Figs. 1 and 2 whereupon the operator views the area under inspection through such lens.

In addition to permitting inspection by an operator of a surface under examination through a magnifying inspection lens, the present instrument also provides facilities for the use of a telescope. In the arrangement shown in the drawings, 50 indicates the telescope generally, such device being made up of an inner tube 51 having a spiral groove 52 in the periphery thereof, and an outer tube 54 having an indentation 55 therein to ride in the groove 52. The inner and outer tubes are provided with lenses 56 and 57 respectively. The free end of the inner tube 51 is externally threaded as at 58 to engage the threads of the insert 45. In addition the inner tube has an enlarged flange 59, the periphery of which is knurled to aid an operator in inserting the telescope into screw threaded relation to the lens mount 42. In the manufacture of the instrument the inspection lens 46 and the two lenses 56 and 57 for the telescope have such characteristics that the inspection lens 46 co-operates with the telescope lenses when the telescope is in use. The inspection lens however is suitable for use per se.

Thus it will be seen from the foregoing that the arrangement just disclosed provides a new otoscope head made up of a plurality of parts, the majority of which are formed of integral construction. For the major part the head is formed on a shell of generally tubular shape in cross-section overlaid by mouldable material, preferably thermoplastic, which mouldable material is of suitable configuration both to support the light projecting member and to provide a bearing for an inspection lens mount which in turn is made up of a mouldable material overlying at least partially a metallic tubular insert.

The instrument just described is of particular advantage for use in the manner in which otoscopes are ordinarily used. During examination of an area, such as an eardrum, the reduced end of the speculum is usually maintained at least one quarter of an inch from the eardrum. Consequently, if the axis of the rays of light directed into the speculum is not coincident with the line of sight thereinto, some shadow will develop beyond the reduced end of the speculum and such shadow is intensified the further the end of the speculum is removed from the field of examination. In the instrument just described, the line of sight is coincident with the axis of the directed light rays, since such line of sight is through the aperture in the mirror, which opening is in the center of the mirror or coaxial with the rays of light directed thereby. Therefore, regardless of the distance between the end of the speculum and the area under examination (within all reasonable ranges) no shadows will be observed by an operator.

The arrangement by which the condensing lens is made adjustable both longitudinally and rotatably of the head permits an operator to adjust the lens to obtain the proper focus of the light rays, passing therethrough upon the mirror and the proper centering of such rays likewise thereupon. The adjustment can be made with both types of movement being accomplished simultaneously.

While the head previously described has been defined as being composed of a metallic shell coated by a suitable material, it is to be understood that the head and the inspection lens mount can be made of suitable metal, which could be die-cast or otherwise formed into the desired shape.

In the modification shown in Fig. 8, parts similar to those previously described have been given similar reference characters, such parts comprising in the main, the supporting member 12 having a part 12' of extended length, the arm 17, the speculum holder 18 and the speculum 19. The head in this form of the invention comprises a metallic shell 20' around which is moulded material following the configuration thereof as at 60, such moulded material having a hood part 61 extending over an electric light bulb 11'. The hood 61 is shaped as shown and has an opening for the seating of a condensing lens or light directing member 62, which member is held in place by a part of the material of the hood being turned over the edge of the lens. The mouldable material likewise has an enlargement 40' similar to the enlargement 40 and the part 40' is shaped in substantially the same fashion as that previously described to support an inspection lens mount 42' similar in all respects to the lens mount 42. Likewise the telescope 50' is similar to the telescope 50 previously described. The head can be locked to extension 12' by set screw 23'. This modification of the invention illustrates another manner in which an inspection lens mount can be secured to an otoscope head whereby the particular mount and associated lens can be utilized alone or in association with a suitable telescope.

From the foregoing it will be seen that the present invention in each of the illustrated embodiments provides a new, simple and efficient otoscope head made up in the major part of mouldable insulating material preferably thermoplastic, which mouldable material is reinforced by a metallic shell. The shell itself, in addition to reinforcing the mouldable material, serves to absorb the principal wear to which the device may be subjected in its operation, such wear being friction and the like. It is to be understood that the invention is capable of modification and therefore is to be limited only by the scope of the following claims.

What is claimed is:

1. In a diagnostic instrument, a support for an electric light bulb, a head fitting over and closely surrounding said bulb and engageable with said support, said head having an integral portion supporting a light directing member for directing light toward an area to be illuminated, an inspection lens mount secured to said head for rotation relative to the head and retaining an inspection lens therein, said mount being so directed relative to said head as to afford inspection through said lens of the area illuminated by said light directing member, said mount being formed to receive an adjustable telescope, the lenses of which are of such character as to complement said inspection lens, said inspection lens being useable in the absence of said telescope, said mount and said telescope being rotated as a unit about an axis at an angle to the axis of the head and light bulb support.

2. In a diagnostic instrument, a support for an electric light bulb, a head fitting over and closely surrounding said bulb and engageable with said support, said head having an integral stud and an integral portion supporting a light directing member for directing light rays toward an area to be illuminated, and an inspection lens mount movably secured to said stud and having a tubular portion retaining an inspection lens therein, said tubular portion having an insert adapted to receive a telescope, the lenses of which are of such character as to complement said inspection lens, said inspection lens being useable in the absence of said telescope, said mount and said telescope being movable as a unit about an axis at an angle to the axis of the head and light bulb support.

3. In a diagnostic instrument, a support for an electric light bulb, a head fitting over and closely surrounding said bulb and engageable with said support, said head having an integral portion supporting a light directing member and being provided with a sight bore, an inspection lens mount secured to said head for rotation relative to the head and retaining an inspection lens therein, said mount being movable to align the inspection lens with the sight bore, said mount being formed to receive an adjustable telescope, the lenses of which are of such character as to complement said inspection lens, said inspection lens being useable in the absence of said telescope, said mount and said telescope being movable as a unit about an axis at an angle to the axis of the head and light bulb support.

4. In a diagnostic instrument, a support for an electric light bulb, a head fitting over and closely surrounding said bulb and engageable with said support, said head having an integral portion supporting a light directing member, an inspection lens mount secured to said head for rotation relative to the head and retaining an inspection lens therein, said mount being movable to position said lens above said supporting portion, said mount being formed to receive an adjustable telescope, the lenses of which are of such character as to complement said inspection lens, said inspection lens being useable in the absence of said telescope, said mount and said telescope being movable as a unit about an axis at an angle to the axis of the head and light bulb support.

5. In a diagnostic instrument, a support for an electric light bulb, a head engageable with said support and having a portion surrounding said light bulb, said portion being of substantially tubular shape in cross section, said tubular shaped portion being extended into an integral hood, a light directing member mounted in said hood to direct rays from said bulb outwardly, a mount in said tubular shaped portion, and a light concentrating member mounted in said mount, said concentrating member being eccentrically disposed relative to said mount and said tubular shaped portion, said mount having its wall in frictional engagement with the wall of said tubular shaped portion and being movable longitudinally of said tubular shaped portion and rotatably relative to said tubular shaped portion both with independence of said movements and with said movements combined, and an operating handle secured to said mount and extending through said tubular shaped portion for manipulating said mount in any of its movements.

6. In a diagnostic instrument, a support for an electric light bulb, a head engageable with said support and having a portion surrounding said light bulb, said portion being of substantially tubular shape in cross section and being extended into an integral hood, a light directing member mounted in said hood, a mount in said tubular shaped portion, and a light concentrating member mounted in said mount, said concentrating member being eccentrically disposed relative to said mount and said shell, said mount having its wall in frictional engagement with the wall of said tubular shaped portion and being movable longitudinally of said tubular shaped portion and rotatably relative to said tubular shaped portion both with independence of said movements and with said movements combined, and an operating handle secured to said mount and extending through said tubular shaped portion for manipulating said mount in any of its movements.

7. In a diagnostic instrument, a support for an electric light bulb, a head engageable with said support and having a portion surrounding said light bulb, said portion being of substantially tubular shape in cross section and being extended into an integral hood, and an inclined reflective light directing member mounted in said hood, said light directing member having a sight opening therein, a mount in said tubular shaped portion and a light concentrating member mounted in said mount, said concentrating member being eccentrically disposed relative to said mount, said mount having its wall in frictional engagement with the wall of said tubular shaped portion and said shell and being movable longitudinally of said tubular shaped portion and rotatably relative to said tubular shaped portion both with independence of said movements and with said movements combined, and an operating handle secured to said mount and extending through said tubular shaped portion for manipulating said mount in any of its movements.

8. In a diagnostic instrument, a support for an electric light bulb, a head engageable with said support and having a portion surrounding said light bulb, said portion being of substantially tubular shape in cross section and being extended into an integral hood provided with a sight bore, an inclined reflective light directing member mounted in said hood, said light directing member having a sight opening aligned with said bore, a mount in said tubular shaped portion and a light concentrating member mounted in said mount, said concentrating member being eccentrically disposed relative to said mount, said mount having its wall in frictional engagement with the wall of said tubular shaped portion and said shell and being movable longitudinally of said tubular shaped portion and rotatably relative to said tubular shaped portion both with independence of said movements and with said movements combined to concentrate rays of light upon said directing member and to compensate for dissymmetry of bulb filament, and an operating handle secured to said mount and extending through said tubular shaped portion for manipulating said mount in any of its movements.

9. In a diagnostic instrument, a support for an electric light bulb, a head fitting over said bulb and engageable with said support, said head having a substantially tubular portion surrounding said bulb and being extended into a hood above said tubular portion, said hood being shaped to provide a mount for a light directing member, said hood having an axial bore of reduced diameter providing a sight passage, and an inclined reflecting surfaced light directing member in said mount and having an inspection opening in line with said bore, said hood having a recess in the top thereof between said sight passage and said light directing member.

10. In an otoscope or similar instrument, a speculum holder, a support for an electric light bulb and a head having a substantially tubular portion of mouldable material extending into an integral hood above said tubular portion, a metallic lining shell permanently secured within said tubular portion, said head being engageable with said support with said tubular portion surrounding said bulb, said hood being shaped to provide a mount for a light directing member positioned to direct light rays toward said speculum holder.

11. In an otoscope or similar instrument, a speculum holder, a support for an electric light bulb and a head having a substantially tubular portion of mouldable material extending into an integral hood above said tubular portion, a metallic lining shell permanently secured within said tubular portion, said head being engageable with said support with said tubular portion surrounding said bulb, said hood being shaped to provide a mount for a light directing member, and a light directing member in said mount inclined to direct rays from said bulb upwardly and outwardly toward said speculum holder.

12. In an otoscope or similar instrument, a speculum holder, a support for an electric light bulb and a head having a substantially tubular portion of mouldable material extending into an integral hood above said tubular portion, a metallic lining shell permanently secured within said tubular portion, said head being engageable with said support with said shell surrounding said bulb and an inclined apertured reflecting surfaced light directing member secured in said mount in position to direct light rays toward said speculum holder.

13. In an otoscope or similar instrument, a speculum holder, a support for an electric light bulb and a head having a substantially tubular portion of mouldable material extending into an integral hood above said tubular portion, a metallic lining shell permanently secured within said tubular portion, said head being engageable with said support with said tubular portion surrounding said bulb, said hood being shaped to closely overlie said bulb and being provided with a mount for a light directing member and a lens type light directing member in said mount for directing light rays toward said speculum holder.

14. In an otoscope or similar instrument, a speculum holder, a support for an electric light bulb and a head having a substantially tubular portion of mouldable material extending into an integral hood above said tubular portion, a metallic lining shell permanently secured within said tubular portion, said head being engageable with said support with said tubular portion surrounding said bulb, said hood being shaped to provide a mount for a light directing member and having an axial bore of reduced diameter providing a sight passage, and an inclined reflecting surfaced light directing member in said mount for directing light rays toward said speculum holder, said light directing member having an inspection opening in line with said bore.

WALTER A. ARNESEN.